United States Patent [19]

Heinold et al.

[11] 3,952,433
[45] Apr. 27, 1976

[54] SPRING CLIP RETAINING MEANS FOR EARTHWORKING TIPS

[75] Inventors: Lloyd K. Heinold; Eugene L. Helton, both of Peoria; Donald J. Larson, Joliet, all of Ill.

[73] Assignee: Caterpillar Tractor Co., Peoria, Ill.

[22] Filed: Sept. 3, 1974

[21] Appl. No.: 502,827

[52] U.S. Cl. ............................ 37/142 A; 24/218; 85/5 M; 85/8.8; 299/92; 403/318
[51] Int. Cl.² .................. E02F 9/28; F16B 21/07; F16B 21/18
[58] Field of Search .................. 37/142 A, 142 R; 299/92, 91, 92; 85/8.8, 5 M, 32; 279/24, 79, 102, 76; 24/218, 27; 403/318, 379, 357, 361, 366, 372, 325; 277/164; 15/250.32; 151/7; 308/184 R

[56] References Cited
UNITED STATES PATENTS

| 1,088,737 | 3/1914 | Soderlund | 277/164 X |
|---|---|---|---|
| 2,427,651 | 9/1947 | Baer | 37/142 A |
| 2,688,475 | 9/1954 | Small | 37/142 R |
| 2,774,430 | 12/1956 | Blazek | 403/318 X |
| 2,824,464 | 2/1958 | Remington | 85/8.8 X |
| 2,957,717 | 10/1960 | Bram | 277/164 X |
| 2,994,140 | 8/1961 | Launder | 37/142 A |
| 3,127,153 | 3/1964 | Elders | 279/79 X |
| 3,144,909 | 8/1964 | Hart et al. | 85/8.8 |
| 3,188,756 | 6/1965 | Baer | 37/142 A |
| 3,197,894 | 8/1965 | Ratkowski | 37/142 A |
| 3,268,260 | 8/1966 | Snipe | 299/91 |
| 3,345,899 | 10/1967 | Fiddler | 151/7 X |
| 3,351,386 | 11/1967 | Prox, Jr. | 299/92 |
| 3,463,521 | 8/1969 | Helton | 299/92 X |
| 3,585,741 | 6/1972 | Heusler | 37/142 R |
| 3,624,827 | 11/1971 | Liess et al. | 37/142 R |
| 3,690,728 | 9/1972 | Krekeler | 37/142 A |
| 3,729,027 | 4/1973 | Bare | 24/27 X |
| 3,740,876 | 6/1973 | Solokhin et al. | 37/142 A |
| 3,751,115 | 8/1973 | Proctor | 37/142 A |
| 3,766,940 | 10/1973 | Mason | 277/164 X |
| 3,767,266 | 10/1973 | Krekler | 299/92 |
| 3,801,210 | 4/1974 | Heinold et al. | 37/142 A X |
| 3,839,805 | 10/1974 | Stepe | 37/142 R |
| 3,856,359 | 12/1974 | Krekler | 299/92 |

FOREIGN PATENTS OR APPLICATIONS

| 1,308,037 | 2/1973 | United Kingdom | 37/142 A |
|---|---|---|---|
| 448,621 | 4/1968 | Switzerland | 37/142 R |
| 2,015,662 | 11/1970 | Germany | 37/142 A |
| 1,066,843 | 6/1954 | France | 85/8.8 |
| 563,969 | 9/1958 | Canada | 277/164 |
| 1,044,489 | 9/1966 | United Kingdom | 24/218 |
| 641,404 | 5/1962 | Canada | 37/142 A |

Primary Examiner—Edgar S. Burr
Assistant Examiner—Steven A. Bratlie
Attorney, Agent, or Firm—Phillips, Moore, Weissenberger Lempio & Strabala

[57] ABSTRACT

An earthworking device comprises a support member having a work tool, such as an earthworking tip, detachably mounted on a forward end thereof. A pin is disposed in aligned bores formed through the support member and the work tool and a spring clip straddles the pin in locked engagement therewith. The spring clip is substantially encapsulated by an elastomeric member which aids in maintaining the spring clip in frictional engagement with the pin. The spring clip may comprise a "hair pin" or U-shaped configuration.

15 Claims, 7 Drawing Figures

U.S. Patent  April 27, 1976  Sheet 1 of 2  3,952,433
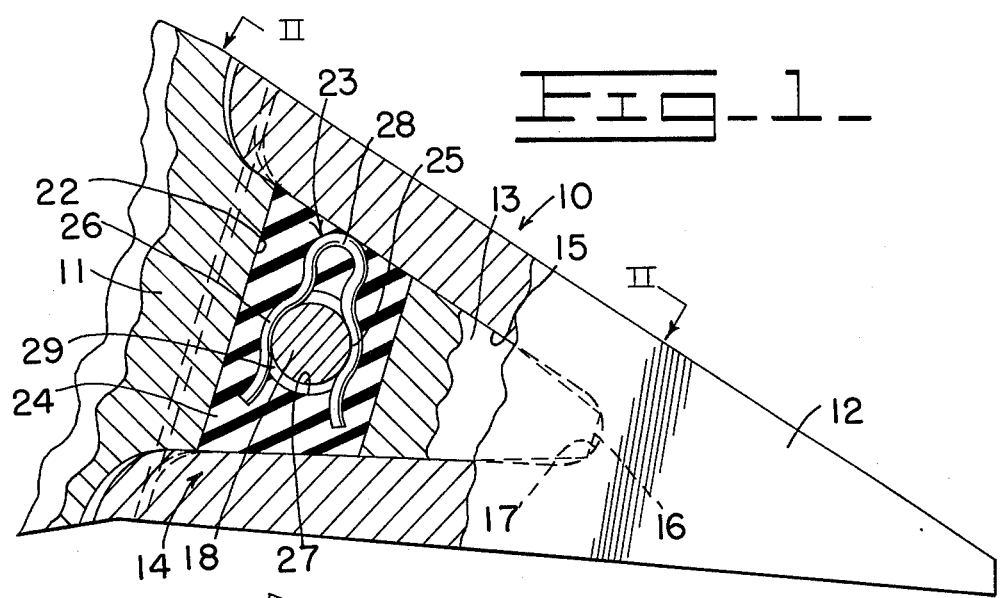
Fig-1-
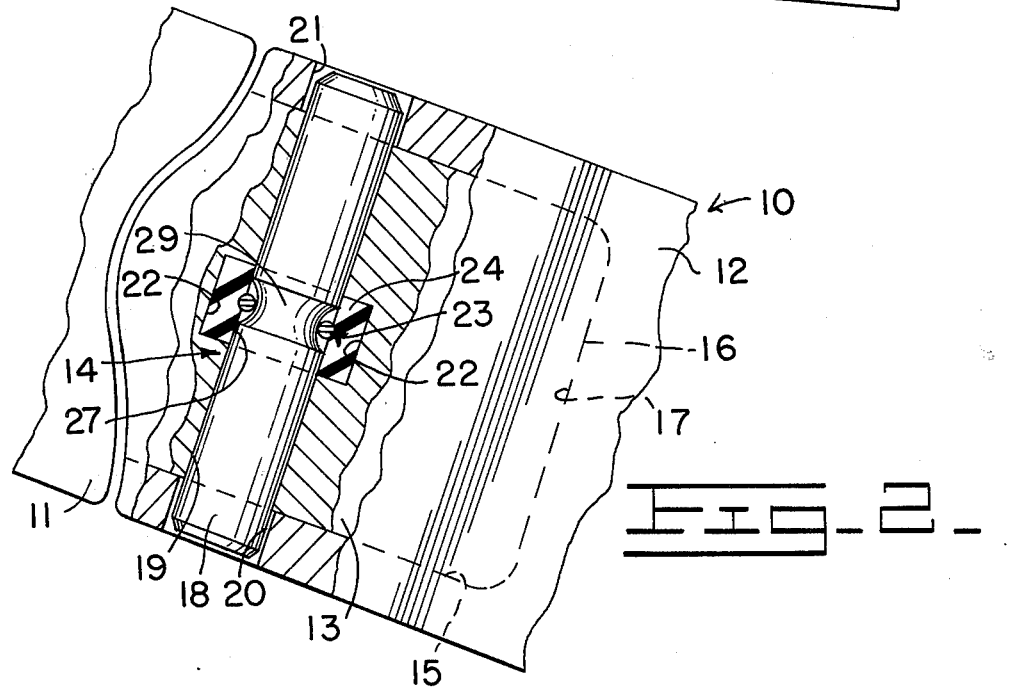
Fig-2-
Fig-3-
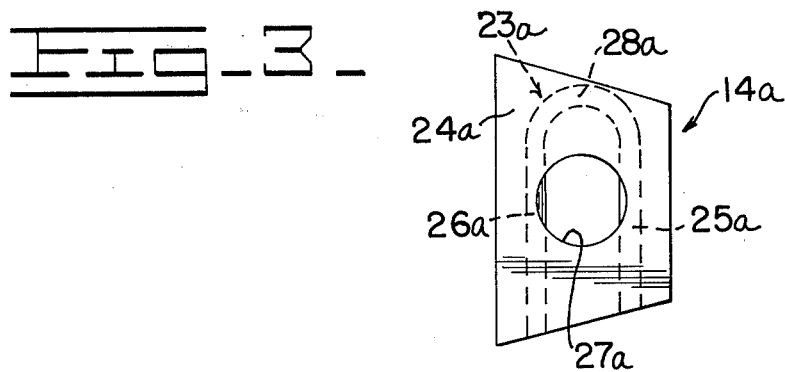

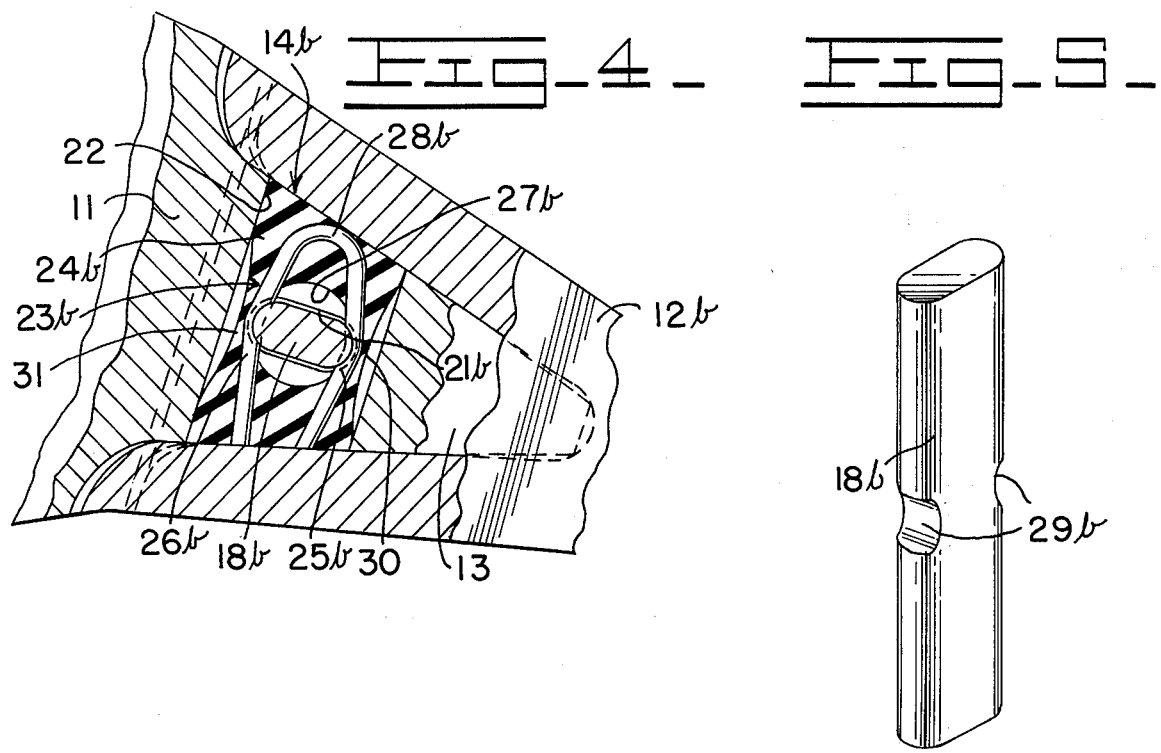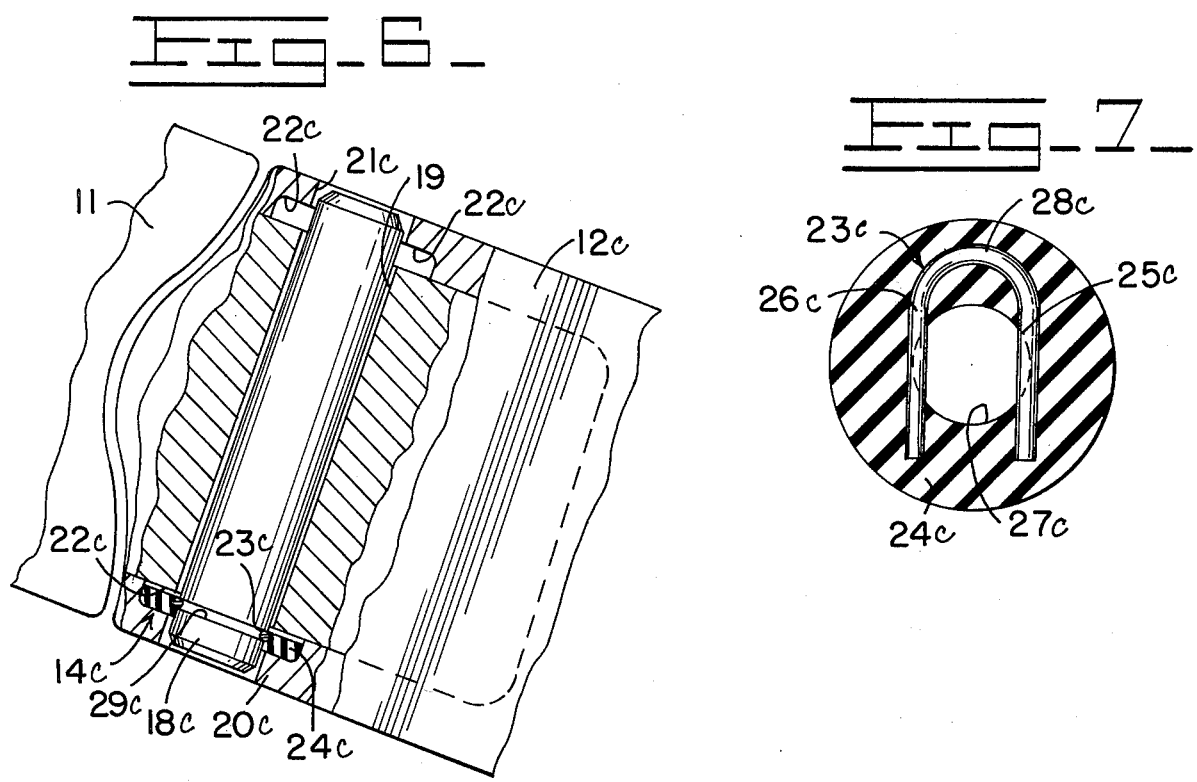

SPRING CLIP RETAINING MEANS FOR EARTHWORKING TIPS

BACKGROUND OF THE INVENTION

Hardened earthworking tips or teeth, such as those employed on rippers, scarifiers and loader buckets, must be held securely in place on a support member and yet be capable of expeditious removal for replacement purposes. Loss of the tip will subject the support member or adapter therefor to damage, thus requiring rather expensive and time consuming replacement thereof. Also, when a hardened tip is employed in conjunction with a rock crushing operation, for example, loss of the tip could cause severe damage to the rock crushing equipment should it become digested thereby.

Conventional retaining means for securing various work tools, such as hardened tips or teeth, in place on conventional earthworking equipment are exemplified by U.S. Pat. Nos. 2,994,140; 3,274,908 and 3,624,827. The latter two patents are assigned to the assignee of this application.

SUMMARY OF THIS INVENTION

An object of this invention is to provide an improved and economical retaining means for positively mounting a work tool on a support member and for permitting expeditious replacement thereof. A pin is disposed in aligned bores formed through the work tool and the support member and the retaining means, comprising a spring clip, straddles the pin in locked engagement on opposite sides thereof. The spring clip is peferably at least substantially encapsulated by an elastomeric member to further aid in maintaining such locked engagement.

BRIEF DESCRIPTION OF THE DRAWING

Other objects of this invention will become apparent from the following description and accompanying drawing wherein:

FIG. 1 is a partially sectioned, side elevational view of an earthworking device comprising a work tool mounted on a support member by a first retaining means embodiment of this invention;

FIG. 2 is a partially sectioned top plan view thereof, taken in the direction of arrows II-II in FIG. 1;

FIG. 3 is a side elevational view of a second retaining means embodiment of this invention;

FIG. 4 is a view similar to FIG. 1, but illustrating a third retaining means embodiment of this invention;

FIG. 5 is an isometric view of a pin used in conjunction with the FIG. 4 retaining means;

FIG. 6 is a view similar to FIG. 2, but illustrating a fourth retaining means embodiment of this invention; and FIG. 7 is an enlarged side elevational view of the FIG. 6 retaining means.

DETAILED DESCRIPTION

FIG. 1 illustrates an earthworking device 10 comprising a support member or adapter 11 having a work tool 12 detachably mounted on a forward end 13 thereof by a first locking or retaining means embodiment 14 of this invention. The work tool may comprise a hardened earthworking tip or tooth mounted on a forwardly disposed cutting edge of a loader bucket. Other uses include the utilization of such tip on rippers or scarifiers, for example.

Forward end portion 13 of the support member is preferably wedge-shaped. A wedge-shaped recess 15 is formed in tip 12 to accommodate the like-shaped forward end portion of the support member. The support member preferably terminates at its apex or nose at a flat surface portion 16 adapted to at least partially abut a surface portion 17 formed at the apex of recess 15.

A pin 18, cylindrical at least substantially throughout its entire length, is disposed in slip-fit relationship within a first bore 19 formed in the support member. A pair of laterally spaced second and third bores 20 and 21 are formed through the sidewalls of the tip to straddle the first bore in axial alignment therewith. Each of the latter two bores preferably have an inside diameter which is slightly larger than the outside diameter of the pin to prevent the imposition of shear loads on the pin during operation of the tip, i.e., such loads will be absorbed at surface 16 of the support member.

The retaining means is disposed in and at least substantially fills a wedge-shaped recess 2 formed centrally in forward end 13 of support member 11. The retaining means comprises a wire spring clip 23, having a "hair pin" or generally U-shape, straddling diametrically opposite sides of the pin in expanded frictional engageent therewith to positively lock the pin and thus tip 12 in place. The spring clip may be composed of a conventional spring steel or like material which will exhibit the desired resiliency and spring-back capabilities required for pin retention purposes. It should be understood that two or more such retaining means may be utilized for work tool applications requiring greater retention capabilities.

The spring clip is preferably at least substantially encapsulated by a wedge-shaped elastomeric member 24, comprising a part of the retaining means and preferably composed of a reinforced rubber material. As shown in FIG. 1, member 24 has a wedge-shaped cross section taken transversely relative to a longitudinal axis of pin 18. The spring clip comprises a pair of legs 25 and 26, preferably exposed internally of a bore 27 formed through the elastomeric member, joined together by a reverse bend 28. The inner, exposed arcuate bends formed in the legs generally conformed to an imaginary circle and the pin and are urged radially inwardly into locked engagement within an annular groove 29 of the pin, formed intermediate the opposite ends thereof, by the elastomeric properties of member 24.

Upon assembly, retaining means 14 is initially placed in recess 22 and tip 12 is then placed on forward end portion 13 of the support member. Pin 18 is then driven manually through aligned bores 19, 20 and 21, by means of a suitable punch and hammer, to expand and snap legs 25 and 26 of the spring clip into locked frictional engagement with pin portions defining groove 29. When it is desired to replace the tip, the pin may be driven in a reverse manner to release it from retaining means 14.

FIGS. 3-7 illustrate alternative embodiments of this invention wherein identical numerals depict corresponding constructions. However, numerals depicting modified constructions are accompanied by an "*a*" in FIG. 3, by a "*b*" in FIGS. 4 and 5, and by a "*a*" in FIGS. 6 and 7.

Referring to FIG. 3, a second retaining means embodiment 14*a* is adapted to be used in lieu of retaining means 14. Retaining means 14*a* comprises a U-shaped spring clip 23*a* at least substantially encapsulated by a wedge-shaped elastomeric member 24a. The spring clip comprises a pair of normally parallel legs 25a and 26a, preferably exposed internally of a bore 27a formed through the elastomeric member, joined together by a reverse bend 28a.

FIG. 4 discloses a third retaining means embodiment 14b also adapted to be used in lieu of retaining means 14. Retaining means 14b comprises a generally U-shaped spring clip 23b having a pair of legs 25b and 26b bowed outwardly relative to each other to straddle a pin 18b in expanded frictional engagement within grooves 29b thereof. The legs are joined together by a reverse bend 28b and the spring clip is at least substantially encapsulated by a wedge-shaped elastomeric member 24b having a bore 27b formed therethrough to accommodate pin 18b.

Forward and rearward walls 30 and 31 of the elastomeric member may be formed concave to accommodate the expansion of legs 25b and 26b when pin 18b is inserted therethrough. A tip 12b is substantially the same as tip 12 of FIGS. 1 and 2 except that bore 21b, for example, is formed into an oblong configuration. Such configuration substantially conforms to the cross section of pin 18b, fully shown in FIG. 5, to prevent rotation of the pin.

FIGS. 6 and 7 illustrate a fourth retaining means embodiment 14c comprising a U-shaped spring clip 23c straddling a pin 18c in expanded frictional engagement within an annular groove 29c thereof. The spring clip is at least substantially encapsulated by a cylindrical elastomeric member 24c having a bore 27c formed therethrough. Legs 25c and 26c of the spring clip are joined together by a reverse bend 28c and are exposed internally of the bore. Although only one of the counterbores 22c of a modified tip 12c accommodates a retaining means 14c therein, it should be understood that a second such retaining means could be suitably disposed in the other bore if so desired.

We claim:

1. In an earthworking device comprising a support member, a work tool mounted on a forward end of said support member, a pin disposed in aligned bores formed through said support member and said work tool and retaining means releasably holding said pin in said bore, the improvement wherein said retaining means comprises an at least generally U-shaped spring clip straddling diametrically opposite sides of said pin in locked, frictional engagement therewith and an elastomeric member at least substantially encapsulating said spring clip, said elastomeric member at least substantially filling a complementary recess formed in one of said support member and said work tool and further comprising concavities formed on opposite sides of said elastomeric member and located in that portion of the side of the member which is closest to the point of contact between said pin and said spring clip for creating space to permit expansion of said spring clip in said recess.

2. The earthworking device of claim 1 wherein said tool constitutes a hardened earthworking tip.

3. The earthworking device of claim 1 further comprising a groove on the periphery of said pin for accommodating each portion of said spring clip held in locked engagement therewith.

4. The earthworking device of claim 1 wherein said pin is cylindrical at least substantially throughout its entire length.

5. The earthworking device of claim 1 wherein said pin has an oblong cross section at least substantially throughout its entire length.

6. The earthworking device of claim 1 wherein said elastomeric member has a wedge-shaped cross section, taken transversely relative to a longitudinal axis of said pin.

7. The earthworking device of claim 6 wherein said recess is formed in said support member, intermediate opposite ends of said pin.

8. The earthworking device of claim 1 wherein said recess is formed in said work tool.

9. The earthworking device of claim 1 wherein said spring clip constitutes a resilient wire having a pair of leg portions straddling said pin in frictional engagement therewith and connected together at a reverse bend formed in said wire.

10. The earthworking device of claim 9 wherein each of said legs comprises an arcuate bend formed therein to at least generally conform to the shape of said pin.

11. The earthworking device of claim 9 wherein said legs are at least generally parallel relative to each other.

12. The earthworking device of claim 1 wherein a forward end portion of said support member is wedge-shaped and wherein said work tool has a wedge-shaped recess formed therein and disposed in accommodating relationship on the wedge-shaped forward end portion of said support member, the apexes of each of the wedge-shaped forward portion of said support member and the wedge-shaped recess formed in said work tool abutting each other.

13. The earthworking device of claim 12 wherein said bores comprise a first bore formed through said support member and a pair of laterally spaced second and third bores disposed on either side of said first bore, each of said second and third bores having an inside diameter which is slightly larger than an outside diameter of said pin whereby forces imposed on said work tool are absorbed directly by said support member and not by said pin.

14. A retaining means releasably attaching a pair of members together, said retaining means holding a pin disposed in aligned bores formed through said members and comprising a single wire spring clip at least substantially encapsulated by an annular elastomeric member having a wedge-shaped cross section which at least substantially fills a complementary recess formed in one of said members and having diametrically opposed portions thereof exposed internally of a bore formed axially through said elastomeric member, said spring clip constituting a pair of leg portions connected together at a reverse bend therebetween and further comprising concavities formed on opposite sides of said elastomeric member and located in that portion of the side of the member which is closest to the point of contact between said pin and said spring clip for creating space to permit expansion of said spring clip in said recess.

15. The retaining means of claim 14 wherein said legs are at least generally parallel relative to each other.

* * * * *